United States Patent Office 3,419,452
Patented Dec. 31, 1968

3,419,452
PROCESS FOR BONDING RUBBER
TO POLYESTER STRUCTURES
Henry R. Krysiak, Wilmington, Del., assignor to E. I.
du Pont de Nemours and Company, Wilmington, Del.,
a corporation of Delaware
No Drawing. Filed Nov. 6, 1964, Ser. No. 409,558
6 Claims. (Cl. 156—328)

ABSTRACT OF THE DISCLOSURE

The process for bonding rubber to polyester structures which comprises coating the structure with an aqueous medium containing dispersed solids of a specific epoxylated novolak resin, a stated proportion of a polypeptide, and a synthetic butadiene/styrene/vinyl pyridine terpolymer latex, heating the coated structure to dry and cure the coating; and then applying and curing the rubber on the coated structure.

This invention relates to the treatment of fibrous material to improve its adhesion to rubber. More particularly, it relates to a novel adhesive composition and method of application particularly suitable for synthetic linear condensation polyester fibers.

In contrast to the naturally occurring polymer fibers such as cotton and the older synthetic fibers such as nylon, the new polyester fibers have been found particularly difficult to bond to rubber. The outstanding properties of polyethylene terephthalate fibers and their commercial availability have made it highly desirable that good polyester-to-rubber adhesives be developed. A number of such adhesives have been proposed, but none has been found fully satisfactory from the point of view of both performance and cost.

The present invention provides a novel adhesive capable of bonding synthetic polyester materials to rubber with good bond strength at low and high temperatures. The adhesive may be prepared from readily available low-cost ingredients and applied to polyester structures in a single application step, thereby offering a considerable cost advantage over previously proposed adhesive systems. The adhesive is applied from an aqueous based medium, thereby eliminating health and fire hazards associated with the use of organic solvents.

In accordance with the present invention, shaped polymer structures are bonded to rubber by a process comprising treating the structure with an aqueous medium containing from about 10% by weight to about 25% by weight of dispersed solids of:

(a) An epoxylated novolak resin preferably having an average of at least 2 epoxy groups in each molecule, an average molecular weight above about 540 and an epoxide equivalent within the range of 200 to 300;

(b) A polypeptide, preferably one of the naturally occurring polypeptides such as zein, casein or caseinate salts, having a molecular weight above about 10,000; and (c) A rubber, preferably a synthetic butadiene/styrene/vinyl pyridine terpolymer latex containing at least 10 mol percent of polymerized vinyl pyridine.

This composition, when applied and processed as described below, provides a final shaped structure bearing a coating of the reaction product of (a), (b) and (c) constituting from about 1% to about 20% by weight of the coated structure. The composition of the present invention is applied to the polymeric shaped structure by any conventional means such as dipping, spraying, or brushing, padding, or the like with the structure relaxed or under tension. After coating with the aqueous mixture described above, the wetted shaped structure is heated at a temperature above 215° C. but below the melting point of the polymer making up the shaped structure, for a period of about 1 to 5 minutes to remove the water and cure the coating. Particularly where the shaped structure is fibrous in nature, it is preferred that the structure be subjected to at least sufficient tension to prevent excessive shrinkage during the coating operation, particularly during the drying and curing step. After drying and curing the adhesive coating, the rubber is applied and cured in conventional fashion to produce a reinforced shaped rubber structure.

The adhesive is suitable for use not only with fibers, yarn and cord, but also with film, sheets, woven and nonwoven fabric and molded structures.

The term "epoxylated novolak resin" is intended to refer to the reaction product obtained by treating a non-heat-hardenable phenol-formaldehyde condensation product with epichlorohydrin. Epoxylated novolaks and methods for their preparation are described in British Patent No. 746,824 published Mar. 21, 1956. Such novolaks are also described by Lee and Neville in "Epoxy Resins" (McGraw-Hill, New York, 1957), page 18. An idealized structural formula for an epoxylated novolak particularly suitable for the present invention is:

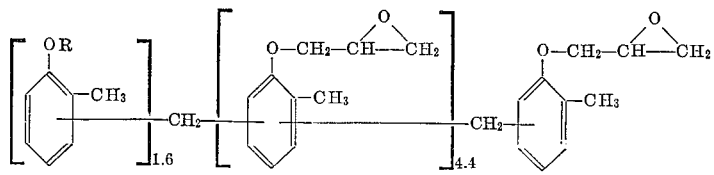

where R may be a chlorohydrin, glycol, or polymeric ether radical. It is preferred that the epoxylated novolak resin constitute about 15% to 40% by weight of the total solids in the adhesive mixture, and be present in the final mixture, as applied, at a concentration in the range 3% to 6% by weight, based on total weight of the aqueous adhesive mixture.

The term "polypeptide" is intended to refer to compounds of two or more amino acids connected by the —CONH— group which have a molecular weight above about 10,000. It is preferred that the polypeptide constitute about 1.5% to 14% by weight of the total solids in the adhesive mixture. Polypeptides may be added to the adhesive composition of this invention in the form of neutral compounds, or they may be added as the reaction product of the polypeptide with a base such as an alkali metal hydroxide or an amine. Suitable polypeptides include the naturally occurring polypeptides, with outstanding examples being zein, casein, casein derivatives and gelatin. Among the suitable polypeptides may be specifically mentioned ammonium caseinate, dimethylamine caseinate, ethylenediamine caseinate, hexamethylenediamine caseinate, morpholine caseinate, lithium, caseinate, potassium caseinate, zinc caseinate, blood albumin, egg albumin and gelatin.

In preparing the adhesive mixture of this invention, the epoxylated novolak is dispersed in water along with a polypeptide and a rubber. Preferably the rubber component of the mixture is a synthetic rubber latex prepared with at least 10 mol percent of vinyl pyridine. Excellent results have been achieved by using commercially available butadiene/styrene/vinyl pyridine terpolymer latexes in which the three components are present in the mole ratio 70/15/15. In the final adhesive mixture it is preferred that the weight ratio of latex solids to epoxylated novolak solids fall in the range 1.7 to 4.6, and that the polypeptide solids be present in the concentration range 1.6% to 16% by weight based upon combined weight of rubber and novolak solids.

Where the final reinforced rubber product is to be subjected to elevated temperatures, a further improvement in adhesive performance is achieved by adding to the adhesive mixture described above a minor amount of formaldehyde or a formaldehyde donor such as hexamethylenetetramine. Formaldehyde provides additional cross-linking which improves the mechanical and thermal stability of the cured adhesive film. Preferably, the amount of formaldehyde added should be in the range 1.2% to 4.5% by weight based upon the total weight of aqueous adhesive mixture.

In the examples illustrating the manner in which the invention may be carried out and the advantages obtained, the strength of the adhesive is determined by the "single-end strip adhesion test" (SESA), or the "H-pull" test.

In preparing samples for the single-end strip adhesion test, lengths of treated cord are placed in the bottom of a steel mold, the cords being parallel with a spacing of 1 inch between cords. The cords are placed under deadweight tension to maintain their position. A sheet of unvulcanized compounded elastomer stock, 125 mils in thickness, is placed over the cords, covered with a cotton duck reinforcing backing, and the top plate of the mold placed over the backing. The mold is put into a platen press. A pressure of approximately 150 pounds per square inch (10.55 kg./cm.²) is applied and the mold is usually heated to about 150° C. for 60 minutes. Other vulcanizing conditions appropriate for individual elastomer compositions may be used. Due to the flow of the rubber stock, the pressure within the mold falls to a low value during the curing cycle. After cooling, the specimen is removed from the press and it is found that the cords are firmly imbedded in the cured elastomer stock, but are visible on the surface. This sheet is cut into 1″ wide strips, each having a cord in the center of its width. The cord end is separated from one end of the strip; the free end of the elastomer strip so obtained is clamped in the upper jaw of an Instron testing machine and the freed end of cord in the lower jaw. The machine is then operated to separate the jaws and thereby to strip the cord from the elastomer sheet in a continuous manner. The tension necessary to strip the cord from the elastomer sheet is determined and is reported in pounds tension per single end of cord. For determination of hot adhesion, the sample is brought to a temperature of 140° C. and held there while the cord is stripped from the elastomer sheet.

The "H-pull" test is a well-known test described, for example, in India Rubber World, 114, 213–219 (May 1946). Briefly, a dipped cord is cured across the center of two small rectangles of rubber with a short length of the cord exposed between the rubber pieces forming the crossbar of the H. The pieces of rubber are gripped in an Instron Tensile Testing machine and stress is applied so that the cord is pulled out from one of the pieces of rubber. The load required is regarded as a measure of the adhesion. In the examples of the present specification, the width of the rubber pieces is ¼ inch (6.3 mm.).

The rubber stock AA used in the adhesion test of the examples has the following composition:

| | Parts by weight |
|---|---|
| Smoked sheet blend | 90 |
| Rolled brown rubber | 10 |
| Zinc oxide | 2.8 |
| Statex B (FF Black) | 25.0 |
| Stearic acid | 1.4 |
| Pine tar | 2.1 |
| Staybelite resin | 2.0 |
| Aminox | 1.54 |
| RPA No. 2 | 0.042 |
| Retarder W | 0.3 |
| Captax | 0.55 |
| Sulfur | 2.87 |
| | 138.602 |

Rubber stock BB used in the adhesion test is a 50–50 blend of natural and styrene-butadiene rubber containing HAF black and a sulfenamide accelerator, with the following composition:

| | Parts by weight |
|---|---|
| Smoked sheets | 50.00 |
| SBR 1500 | 50.00 |
| HAF Black | 35.00 |
| Zinc oxide | 3.00 |
| Stearic acid | 1.00 |
| Naphthenic oil | 10.00 |
| "Agerite Resin D" | 1.00 |
| "NOBS" Special | 1.25 |
| "MBTS" | 0.25 |
| Insoluble sulfur | 2.50 |
| | 154.00 |

In the following examples, which illustrate specific embodiments of the invention, all parts and percentages are by weight unless otherwise indicated.

EXAMPLE I

An adhesive mixture is prepared as follows:

An aqueous slurry of an epoxylated novolak resin, having a softening point of 99° C., an average molecular weight of 1270, an oxirane oxygen content of 6.6–7.0% and an epoxide equivalent of 235, is prepared by adding 150 parts of the resin to 441 parts water and 9 parts of a 75% solution of dioctyl-sodium-sulfosuccinate, and ball-milling the mixture for a period in excess of 24 hours. Then 50 parts of this epoxylated novolak slurry is added to a solution of 2 parts of ammonium caseinate in 100 parts water, along with 100 parts of a 41% solids butadiene/styrene/vinyl pyridine (70/15/15) terpolymer latex. After a few minutes of vigorous mixing the adhesive mixture is ready for use.

A polyethylene terephthalate tire cord having an 840 denier/two-ply (94 tex/two-ply) construction is dipped in the above-prepared mixture and then hot-stretched by passing it through an oven at a temperature of 224° C. with an exposure time of 1 minute and an applied stretch of 2%. The resulting adhesive-treated cord is tested for adhesion in the single-end strip adhesion test using rubber stocks AA and BB with a testing temperature of 24° C. The test values obtained are 3.8 lbs. (1.73 kg.) for rubber stock AA and 4.6 lbs. (2.09 kg.) for rubber stock BB.

For comparison, the test is repeated without the ammonium caseinate present in the adhesive mixture. For this test, 50 parts of the epoxylated novolak slurry is mixed with 100 parts of the 41%-solids latex and 50 parts water and then applied to polyethylene terephthalate tire cord in the same manner as described above. In the single-end strip adhesion test at 24° C. with this control cord, values of less than 1 lb. are obtained with rubber stock AA and less than 1.7 lbs. are obtained with rubber stock BB.

EXAMPLE II

An adhesive mixture is prepared by dissolving 10 parts zein in 90 parts 95% ethanol to give a 10% solution and then mixing 15 parts of this 10% zein mixture with 25 parts of the 25% epoxylated novolak slurry described in Example I and 50 parts of the 41%-solids latex described in Example I, along with 50 parts water. The mixture is vigorously mixed and is then ready for use. Polyethylene terephthalate tire cord of 840 denier/two-ply (94 tex/two-ply) construction is dipped in the mixture and then cured at 224° C. using an exposure time of 1 minute and applying 2% stretch. The dipped cord is found to have an adhesive coating of 7.6% by weight. The cord is tested for adhesion in the single-end strip adhesion test with the results shown in the following table.

TABLE 1.—SINGLE-END STRIP ADHESION TEST

| Rubber Stock | Test value, lbs. | |
|---|---|---|
| | 24° C. | 140° C. |
| AA | 3.0 | 2.1 |
| BB | 4.8 | |

EXAMPLE III

This example illustrates the preparation of adhesive mixtures using solutions of zein in dilute alkali.

A mixture of 150 parts of the epoxylated novolak described in Example I with 8 parts of a 75% solution of dioctyl-sodium-sulfosuccinate, 2 parts of 5 N sodium hydroxide solution, 30 parts zein, and 410 parts water is ball-milled for a period of 24 hours. Then 50 parts of this mixture is mixed with 100 parts of the 41%-solids latex of Example I and 150 parts water. The final adhesive mixture is then used to treat polyethylene terephthalate tire cord in the manner described in Example I and tested for adhesion with the results shown in the following table.

TABLE 2

| Test | Rubber stock | Test values, lbs. | |
|---|---|---|---|
| | | 24° C. | 140° C. |
| SESA | AA | 4.3 | 1.9 |
| SESA | BB | 3.7 | |
| H-pull | AA | 28 | 17 |
| H-pull | BB | 24 | 12 |

EXAMPLE IV

This example illustrates the improvement in hot adhesion obtained by adding a formaldehye donor.

A mixture of 50 parts of the ball-milled slurry of Example III, containing epoxylated novolak and zein, with 100 parts of a 41%-solids butadiene/styrene/vinyl pyridine (70/15/15) copolymer latex; 150 parts of water and 10 parts of hexamethylenetetramine is prepared. This mixture is used to treat polyethylene terephthalate tire cord in the manner of Example I and treated cord is tested for adhesion to rubber. With rubber stock BB an SESA value of 6.3 lbs. (2.87 kg.) is obtained at 24° C. and with rubber stock AA an SESA value of 2.5 lbs. (1.14 kg.) is obtained at 140° C. These values compare favorably with the SESA values in Example III.

EXAMPLE V

A series of adhesive mixtures are prepared having the following general composition (the percentages are approximate):

| | Percent |
|---|---|
| Epoxylated novolak of Example I | 4 |
| Polypeptide (see Table 3) | 0.65 |
| Vinyl-pyridine-terpolymer latex solids | 13 |
| Water | 82 |
| Bactericide (sodium pentachlorophenate) | Trace |

Each mixture is applied to polyethylene terephthalate tire cord in the manner of Example I and tested for adhesion in rubber stock BB at 24° C. The single-end strip adhesion test values are shown in the following table.

Table 3

| Polypeptide: | SESA, lbs. |
|---|---|
| Ammonium caseinate | 4.6 |
| Dimethylamine caseinate | 3.9 |
| Ethylenediamine caseinate | 3.6 |
| Morpholine caseinate | 3.0 |
| Potassium caseinate | 4.4 |
| Sodium caseinate | 4.0 |
| Zinc caseinate | 2.4 |
| Egg albumin | 2.7 |
| Gelatin | 3.6 |
| Zein | 4.0 |

EXAMPLE VI

This example illustrates the use of the adhesive of this invention in the preparation of a pneumatic tire.

A stock slurry is prepared by ball-milling for 48 hours a mixture of epoxylated novolak and zein as indicated in the table below. This stock slurry is then used to prepare two adhesive tips coded Dip VI–A and Dip VI–B having the indicated compositions.

Stock slurry

| | Parts |
|---|---|
| Powdered epoxylated novolak (as in Example I) | 750 |
| 5 N NaOH solution | 15 |
| $H_2O$ | 2059 |
| Zein | 167 |
| Dioctyl sodium sulfosuccinate (75%) | 40 |

| DIP VI–A | DIP VI–B |
|---|---|
| 1,000 parts stock slurry | 1,000 parts stock slurry. |
| 2,000 parts vinyl pyridine copolymer latex. | 3,000 parts water. |
| 3,000 parts water | 2,000 parts vinyl pyridine copolymer latex. |
| | 90 parts hexamethylene tetramine. |

Polyethylene terephthalate tire cord having an 840-denier/2-ply (94 tex/2-ply) construction is used to prepare adhesive-coated cord samples from the two adhesive dips. In each case the cord is dipped and then stretched 5% at 220° C. with an exposure time of 1 minute.

For comparison purposes a third cord sample (coded Dip VI–C) is prepared using an adhesive described in French Patent No. 1,340,352 which requires applying a subcoat containing phenol-blocked methylene-bis-4-phenylisocyanate and an epoxy resin, curing, and then overcoating with a resorcinol-formaldehyde-vinyl pyridine latex (RFL) adhesive. The subcoating is applied to the cord and dried at 218° C. for 1 minute with 5% applied stretch, and then the RFL topcoat is applied and dried at 210° C. for 1 minute with 0% applied stretch. This adhesive is considered one of the best of the previously known polyester-to-rubber adhesives, but requires the use of an expensive isocyanate ingredient, as well as the use of a two-step application process.

The three adhesive-coated cords are used to prepare several 4-ply 8.50–14 automobile tires utilizing standard tire construction techniques. Rubber stock BB is used as the skim rubber coat next to the cord. The completed tires are subjected to an accelerated high-speed indoor endurance test in which each tire is run against a steel wheel under a load of 1205 lbs. at an ambient temperature of 100° F. (38° C.) with the tires inflated to 22 p.s.i. (1.55 kg./cm.$^2$). The tires are brought to temperature, run at 60 miles per hour for the first 2 hours, then 75 m.p.h. for one hour, and then the speed raised 5 m.p.h. each hour thereafter until failure occurs The final speed reached before failure (m.p.h.) and the miles traveled at the final speed until failure occurred are given in the table below. It is noted that the tires prepared with the adhesive of this invention (Dips VI–A and VI–B) are at least as good as the tires prepared with the more expensive control adhesive (Dip VI–C). Performance of all three adhesives was considered excellent in this test. None of the tires lost air at failure.

TABLE 4.—EVALUATION OF CORD ADHESIVES IN TIRES BY ACCELERATED HIGH-SPEED ENDURANCE TEST

| Cord adhesive | Test tire | Final speed (m.p.h.) | Miles traveled at final speed |
|---|---|---|---|
| Dip VI-A | 1 | 100 | 34 |
| | 2 | 105 | 7 |
| | 3 | 100 | 48 |
| Dip VI-B | 1 | 100 | 55 |
| | 2 | 100 | 38 |
| Dip VI-C | 1 | 100 | 60 |
| | 2 | 100 | 28 |

The present invention provides an adhesive for bonding polyester articles to rubber with good bond strength. Furthermore, the adhesive may be prepared from readily available, low-cost ingredients, and is applied to the polyester article in a single-coating step, thereby providing greater efficiency of operation than known adhesive systems requiring a two-step application. The invention has been illustrated with polyester fibers, since known adhesives for polyester fibers have been inadequate in many respects. However, the process of the invention is also useful for treating any fibrous material for use in reinforcing rubber products, such as cotton, rayon, nylon, and the like.

Compositions produced according to the invention may be utilized for a wide variety of important industrial applications. They may be used, for example, in the preparation of pneumatic tires for automobiles, buses, tractors, and aircraft, in transmission belts, conveyor belts, floor tiles, hoses, raincoats, luggage, tarpaulins, and the like.

Since many different embodiments of the invention may be made without departing from the spirit and scope thereof, it is to be understood that the invention is not limited by these specific illustrations except to the extent defined in the following claims.

I claim:
1. The process for bonding rubber to a shaped structure composed of synthetic linear condensation polyester which comprises
   (1) coating the structure with an aqueous medium containing from about 10% to 25% by weight of dispersed solids of:
      (a) an epoxylated novolak resin that is the reaction product of a non-heat-hardenable phenol-formaldehyde condensation product with epichlorohydrin having an average of at least 2 epoxy groups in each molecule, an average molecular weight above about 540 and an epoxide equivalent within the range of 200 to 300;
      (b) from about 1.5% to 14% by weight of the total solids of a naturally occurring polypeptide having a molecular weight above about 10,000, and
      (c) a synthetic butadiene/styrene/vinyl pyridine terpolymer latex containing at least 10 mol percent of polymerized vinyl pyridine, the weight ratio of latex solids to epoxylated novolak resin being within the range of 1.7 to 4.6,
   (2) heating the coated structure at a temperature above 215° C. and below the melting point of the polyester structure to dry and cure the coating, and
   (3) applying and curing a layer of rubber on the coated structure.

2. A process as defined in claim 1 wherein the aqueous medium contains 3% to 6% by weight of the epoxylated novolak resin.

3. A process as defined in claim 1 wherein the aqueous medium contains 1.2% to 4.5% by weight of formaldehyde.

4. A process as defined in claim 1 wherein the dried and cured coating of step (2) constitutes from about 1% to 20% by weight of the coated structure.

5. A process as defined in claim 1 wherein a fibrous structure is coated and is maintained under sufficient tension to prevent shrinkage during the drying and curing step (2).

6. A process as defined in claim 1 wherein a cord of polyethylene terephthalate fibers is dip-coated with an aqueous medium containing (a) 3% to 6% by weight of the epoxylated novolak resin, (b) a polypeptide selected from the group consisting of zein, casein and caseinate salts, and (c) butadiene/styrene/vinyl pyridine terpolymer latex in which these components are present in the mol ratio 70/15/15.

References Cited

UNITED STATES PATENTS

| | | | |
|---|---|---|---|
| 2,902,398 | 9/1959 | Schroeder | 161—92 X |
| 2,903,381 | 9/1959 | Schroeder | 117—138.5 X |
| 2,917,422 | 12/1959 | Waller | 117—7 X |
| 2,930,728 | 3/1960 | Navikas | 156—328 |
| 3,020,250 | 2/1962 | Norwalk | 260—6 X |
| 3,036,948 | 5/1962 | Danielson | 161—252 X |
| 3,166,523 | 1/1965 | Weinheimer | 161—184 X |
| 3,222,238 | 12/1965 | Krysiak | 161—231 X |
| 3,231,412 | 1/1966 | Pruitt et al. | 161—253 X |
| 3,234,067 | 2/1966 | Krysiak | 156—330 |

EARL M. BERGERT, *Primary Examiner.*

R. A. KILLWORTH, *Assistant Examiner.*

U.S. Cl. X.R.

156—330; 161—184, 231; 117—138.8